(12) United States Patent
DeCusatis et al.

(10) Patent No.: US 8,274,889 B2
(45) Date of Patent: Sep. 25, 2012

(54) METHOD, SYSTEM AND COMPUTER PROGRAM PRODUCT INVOLVING CONGESTION DETECTION IN ETHERNET

(75) Inventors: Casimer DeCusatis, Poughkeepsie, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 12/050,519

(22) Filed: Mar. 18, 2008

(65) Prior Publication Data

US 2009/0238211 A1    Sep. 24, 2009

(51) Int. Cl.
*H04L 12/26* (2006.01)
(52) U.S. Cl. ............... 370/231; 370/232; 370/230.1; 370/235
(58) Field of Classification Search ............ 370/498, 370/235, 231, 230.1, 232
See application file for complete search history.

(56) References Cited

U.S. PATENT DOCUMENTS

| | | | | |
|---|---|---|---|---|
| 6,996,626 | B1 * | 2/2006 | Smith | 709/232 |
| 7,826,376 | B1 * | 11/2010 | Kritov et al. | 370/241 |
| 2007/0280293 | A1 * | 12/2007 | Rajakarunanayake | 370/474 |
| 2008/0069127 | A1 * | 3/2008 | Khalil et al. | 370/412 |

OTHER PUBLICATIONS www.ieee802.org/1/files/public/docs2005/new-wadekar-virtual%20-links-0305.pdf-.

* cited by examiner

*Primary Examiner* — Huy D Vu
*Assistant Examiner* — Omer Mian
(74) *Attorney, Agent, or Firm* — Cantor Colburn LLP; Steven Chiu

(57) ABSTRACT

A method for determining data packet transmission times in an Ethernet protocol including, receiving a first data packet having a first data packet send time, wherein the first data packet send time is a time the data packet is sent by a source transmitter, subtracting the first data packet send time from a first data packet receive time to yield a first data packet transmission time, wherein the first data packet receive time is the time the data packet is received by a destination receiver, comparing the first data packet transmission time to a third time, determining whether a difference between the first data packet transmission time and the third time exceeds a threshold value, and sending a notification of a transmission delay responsive to determining that the difference between the first data packet transmission time and the third time exceeds the threshold value.

19 Claims, 4 Drawing Sheets

METHOD, SYSTEM AND COMPUTER PROGRAM PRODUCT INVOLVING CONGESTION DETECTION IN ETHERNET

BACKGROUND OF THE INVENTION

This invention relates generally to Ethernet, and more particularly to detecting network congestion in an Ethernet protocol.

Ethernet is a frame-based networking technology for local area networks. The Ethernet protocols are standardized in, for example, IEEE 802.3. Data is sent via Ethernet protocols over networks via switches, bridges, and hubs that are hardware devices designed to transmit data with the Ethernet protocol.

Data Center Ethernet (DCE) is a modification of the Ethernet standard that may allow Ethernet to be a preferred protocol for all types of data center network traffic. This may also be known by other names, such as, for example, low latency Ethernet, next generation Ethernet, or Fibre Channel over Ethernet. The use of many different protocol standards in data centers leads to problems in implementing data center systems.

It would be desirable to develop a DCE protocol that takes advantage of the prevalent use of the Ethernet protocol and incorporates additional features for data center use.

BRIEF SUMMARY OF THE INVENTION

An exemplary method for determining data packet transmission times in an Ethernet protocol including, receiving a first data packet having a first data packet send time, wherein the first data packet send time is a time the data packet is sent by a source transmitter, subtracting the first data packet send time from a first data packet receive time to yield a first data packet transmission time, wherein the first data packet receive time is the time the data packet is received by a destination receiver, comparing the first data packet transmission time to a third time, determining whether a difference between the first data packet transmission time and the third time exceeds a threshold value, and sending a notification of a transmission delay responsive to determining that the difference between the first data packet transmission time and the third time exceeds the threshold value.

An exemplary embodiment includes, a system for receiving data comprising a destination receiver including a second clock, wherein the destination receiver is operative to receive a first data packet having a first data packet send time, wherein the first data packet send time is a time the data packet is sent by a source transmitter, subtract the first data packet send time from a first data packet receive time to yield a first data packet transmission time, wherein the first data packet receive time is the time the data packet is received by the destination receiver, compare the first data packet transmission time to a third time, determine whether a difference between the first data packet transmission time and the third time exceeds a threshold value, send a notification of a transmission delay responsive to determining that the difference between the first data packet transmission time and the third time exceeds the threshold value.

An alternate exemplary embodiment includes, a computer program product for providing real-time recommendations, the computer program product comprising, a computer-readable storage medium for storing instructions for executing a real-time recommendation service, the real-time recommendation service comprising a method of, receiving a first data packet having a first data packet send time, wherein the first data packet send time is a time the data packet is sent by a source transmitter, subtracting the first data packet send time from a first data packet receive time to yield a first data packet transmission time, wherein the first data packet receive time is the time the data packet is received by a destination receiver, comparing the first data packet transmission time to a third time, determining whether a difference between the first data packet transmission time and the third time exceeds a threshold value, and sending a notification of a transmission delay responsive to determining that the difference between the first data packet transmission time and the third time exceeds the threshold value.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

An exemplary embodiment of the present invention provides improved network congestion detection in an Ethernet protocol.

As data packets are sent over a network, a variety of network conditions may delay the data packets. Nodes such as, for example, switches and routers in the network may include buffers that save data packets. If the buffers fail, or become full, the data packets may be delayed. Thereby, slowing down the network. Some nodes may experience transient failures causing delays in the transmission of data packets. It is desirable to detect delays in the transmission of data packets to alert a system or operator that there may be problems in a network.

Figure 1:
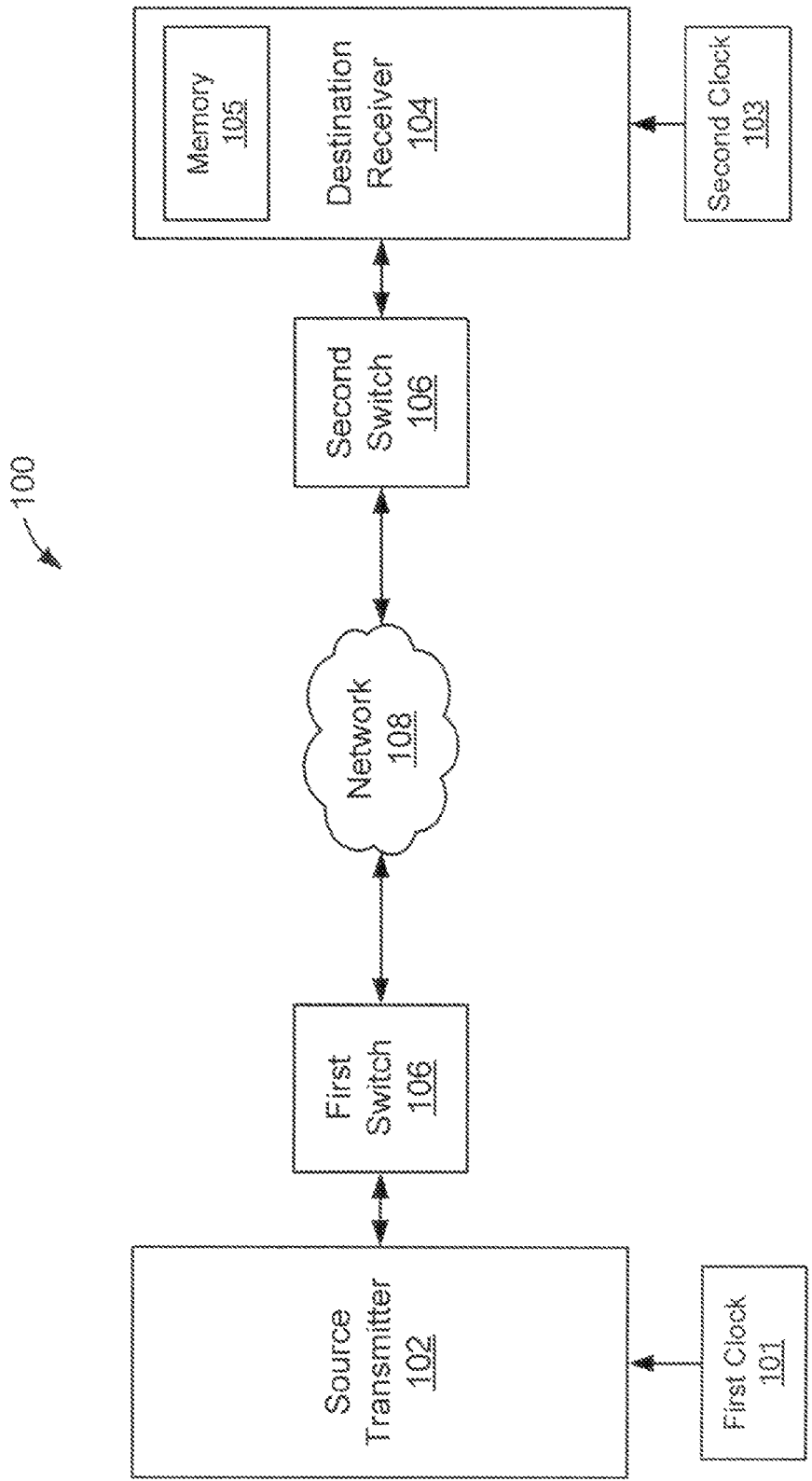
FIG. 1 illustrates an exemplary embodiment of a data network.

FIG. 1 illustrates an example of a data network 100 including a source transmitter 102 communicatively connected to a first switch 106. The source transmitter receives a signal from a first clock 101. The first switch 106 is communicatively linked to a network 108 that may include, for example, additional nodes having switches. The network 108 is communicatively linked to a second switch 106 that is communicatively linked to a destination receiver 104 having and a memory 105. The destination receiver 104 receives a signal from a second clock 103.

Figure 2:
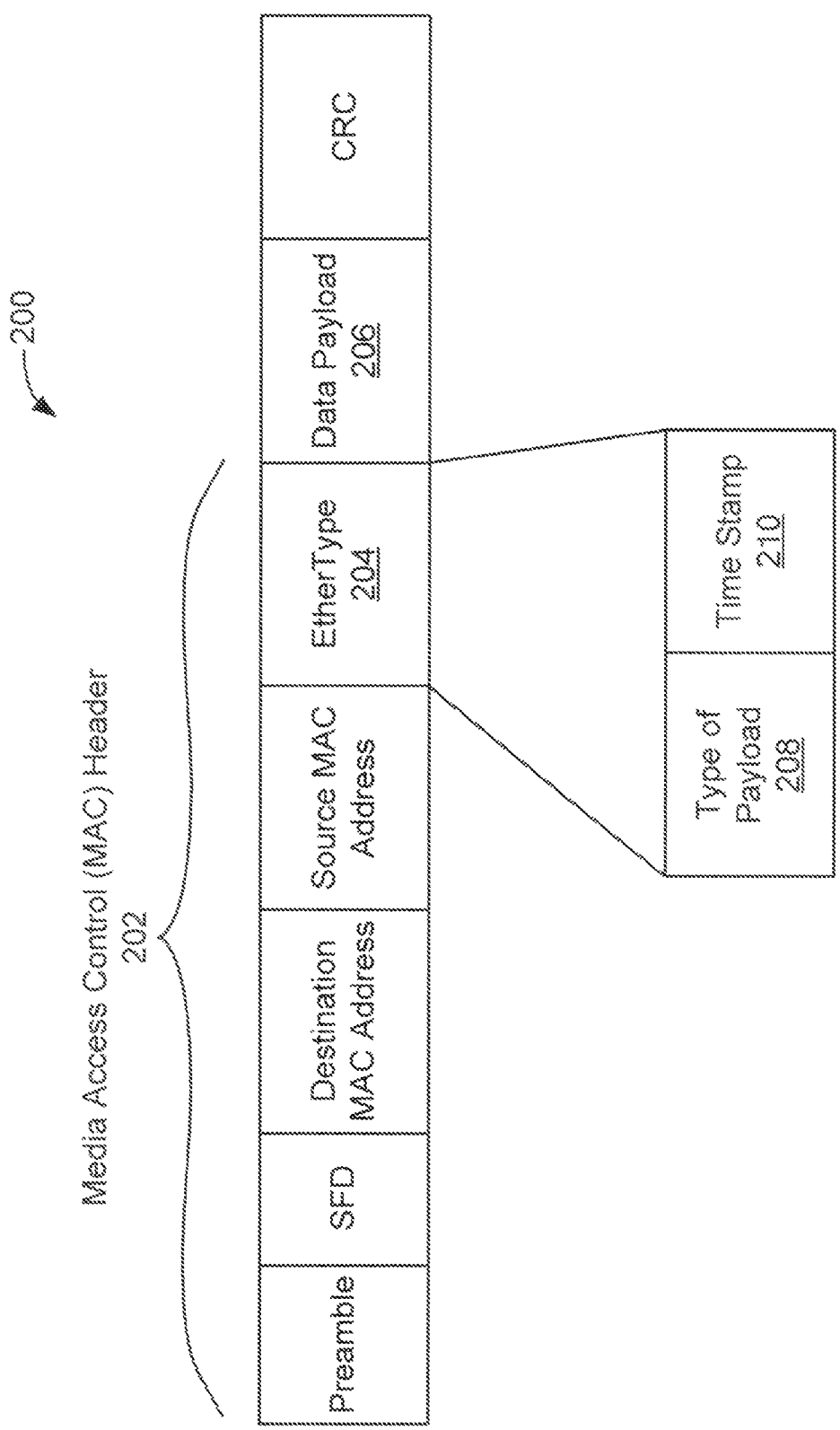
FIG. 2 illustrates an exemplary embodiment of a data packet.

A proposed addition to the DCE protocol is time stamping data packets. FIG. 2 illustrates an exemplary embodiment of a DCE data packet 200 having a variety of fields. The data packet 200 includes a MAC header 202, a payload field 206 that holds the sent data, and an EtherType field 204, The data packet 200 includes an expanded EtherType field 204. The EtherType field 204 includes a type of payload field 208 that is similar to conventional Ethernet type of payload fields, and a time stamp field 210. FIG. 2 illustrates the time stamp field 210 located in the EtherType field 204, however the sequence of the fields may be different and is not limited to that shown in FIG. 2. The time stamp field 210 may be located in a different field than illustrated in FIG. 2, and is not limited by FIG. 2.

Figure 3:
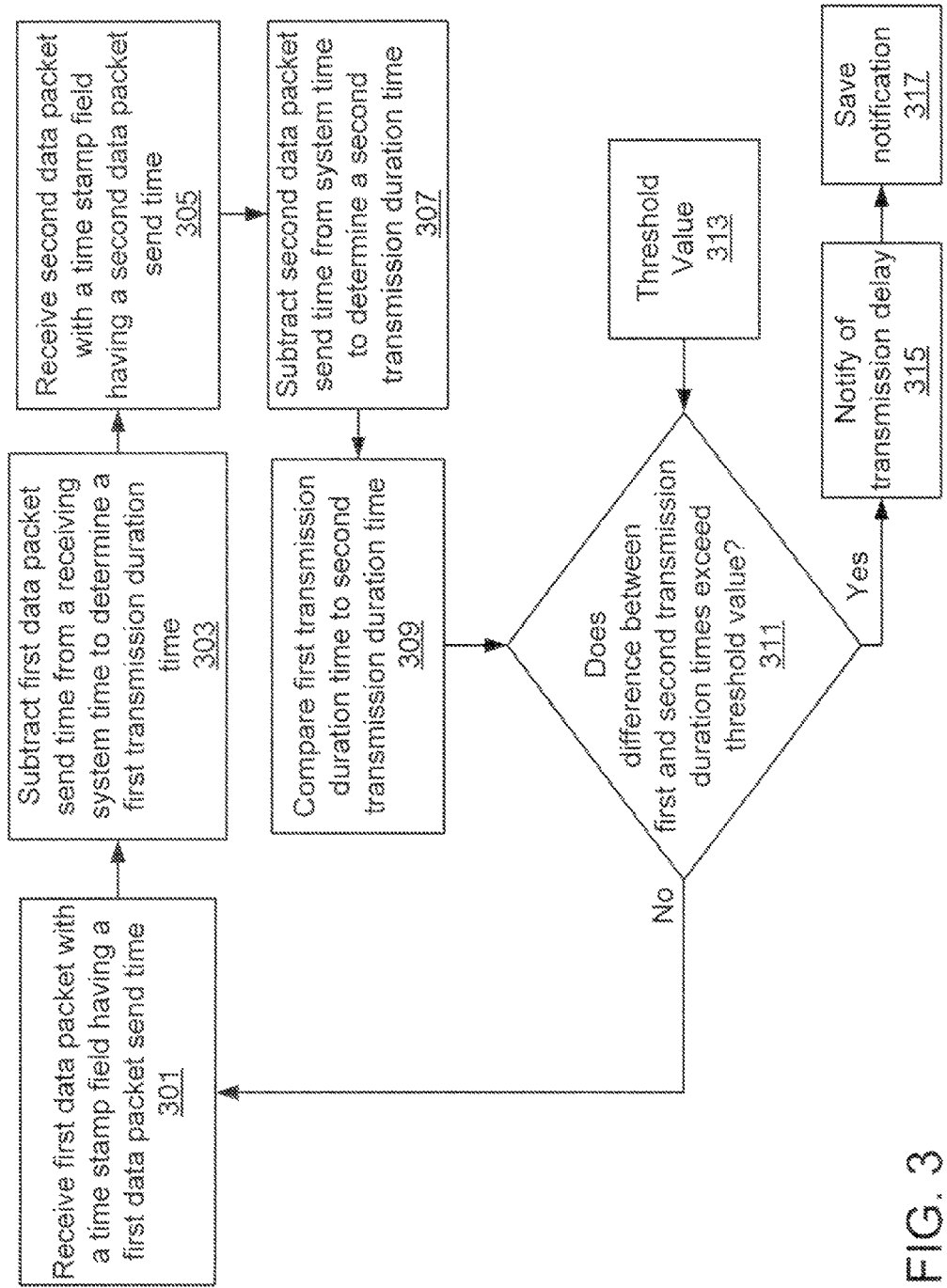
FIG. 3 illustrates an exemplary a method for detecting network congestion.

An exemplary method of operation is illustrated in the block diagram of FIG. 3. In operation, the time stamp field 206 includes a first data packet send time that is written by the source transmitter 102 (of FIG. 1) when the first data packet is sent. The first data packet send time is determined by the first clock 101 linked to the source transmitter 102.

The first data packet is sent to the destination receiver 104 via the first switch 106, the network 108, and the second switch 106. In block 301, the destination receiver 104 receives the first data packet including the first data packet send time. The first data packet send time is compared to the time the first data packet is received by the destination receiver 104 as determined by the second clock 103. The difference between the first data packet send time and the first data packet receive time is the first transmission duration time as determined in block 303. In block 305 the destination receiver 104 receives a second data packet—similar to the first data packet—having a second data packet send time. The second data packet send time is compared to the time the second data packet is received by the destination receiver 104 in block 307 to determine a second transmission duration time.

In block 309, the first transmission duration time is compared to the second transmission duration time. The comparison may include, for example, determining a difference between the first and second transmission duration times in a time domain, or determining a percentage difference between the first and second transmission duration times. A threshold value 313 may be used to determine whether the difference between the first and second transmission duration times exceeds a limit set by a system operator. If the difference between the first and second transmission duration times exceeds the threshold value 313 in block 311, a notification of a transmission delay may be sent to the system operator, in block 315. The notification may also be logged into the memory 105 in block 317. A transmission delay may indicate, for example, that the data network 100 is congested, or may have experienced a hardware or software transient failure. If the difference between the first and second transmission duration times does not exceed the threshold value 313 in block 311, the method returns to block 301, and may repeat.

In the illustrated method of FIG. 3, the first clock 101 and the second clock 103 are not synchronized. For example, the difference between absolute values of the first and second transmission duration times allows the determination of a difference between the transmission times. Indicating a possible problem in the network. The actual transmission times of the first and second data packets are not necessary to determine whether the transmission times are different (assuming that tile first clock 101 and the second clock 103 maintain uniform times respectively).

The method illustrated in FIG. 3 is not limited to two data packet transmission times. A similar method may be used to analyze a number of data packet transmission times to determine delays in the transmission of data packets over the network 108.

Figure 4:
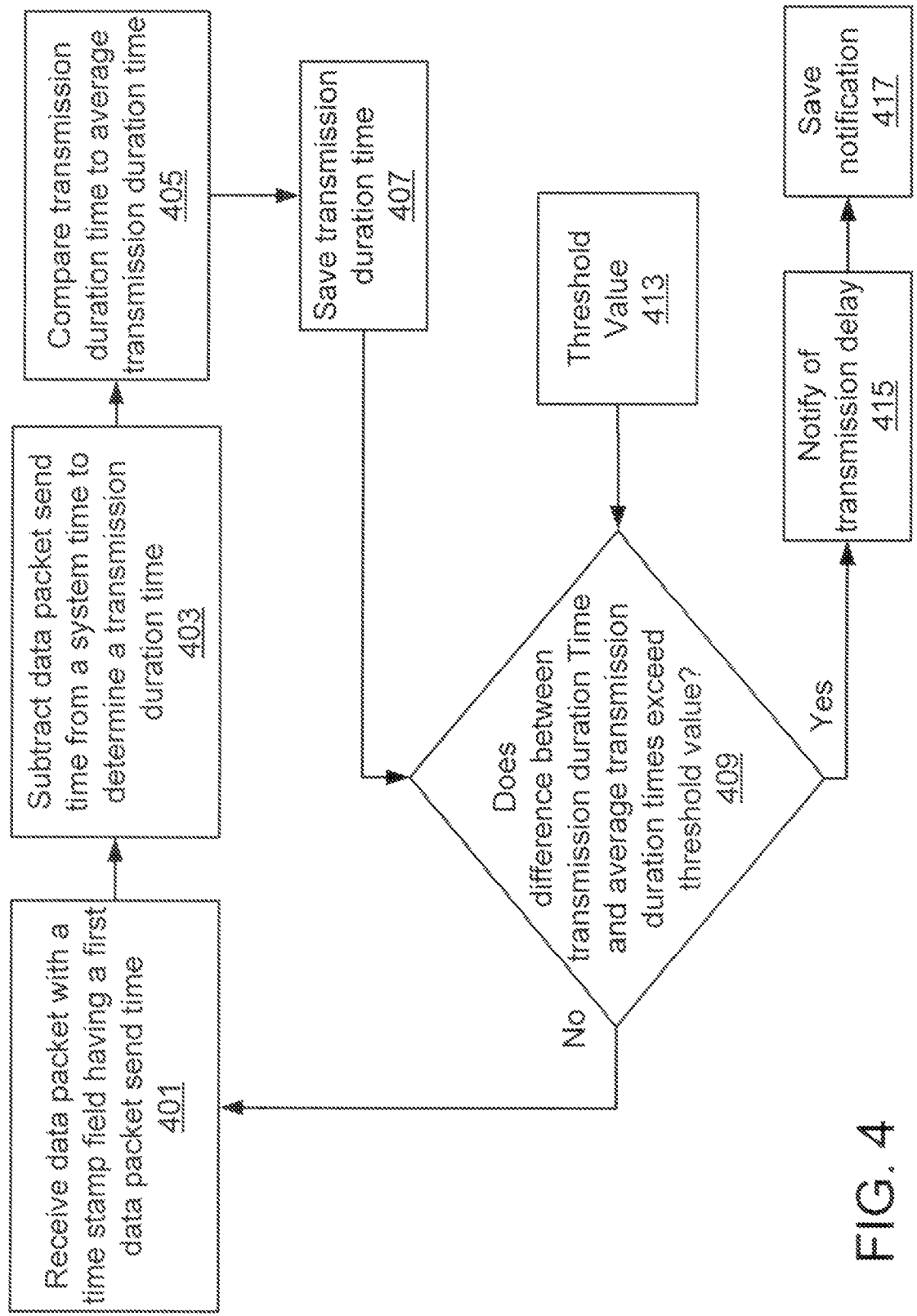
FIG. 4 illustrates an alternate exemplary method for detecting network congestion.

FIG. 4 illustrates an alternate method for determining delays in the transmission of data packets. In block 401, a first data packet is received having a first data packet send time. In block 403, the first data packet send time is subtracted from the time on the second clock 103 that the first data packet is received by the destination receiver 104 resulting in a transmission duration time. The memory 105 in the destination receiver 104 may include a file with a plurality of transmission duration times previously determined by a similar method. The plurality of transmission duration times may be averaged to yield an average transmission duration time. The average transmission duration time is compared to the transmission duration time in block 405. In block 407, the transmission duration time is saved in the memory 105. In block 409, if the difference between the transmission duration time and the average transmission duration time exceeds a threshold value 413, a notification of a transmission delay may be sent in block 415. The notification may also be saved in the memory 105 in block 417. If the difference between the transmission duration time and the average transmission duration time does not exceed the threshold value 413, the method returns to block 401 and may be repeated.

Technical effects and benefits include a method for comparing the transmission times of data packets sent from a source transmitter to a destination receiver over a network. The comparison of transmission times between one data packet and an average of transmission times of a number of data packets allows the determination of an increase in data packet transmission times. If an increase is detected, a notification may be sent to a system operator or logged into a data file. A detected increase may provide an early indication of failures in a data network due to hardware or software failures or congestion on the network. The benefits of the method allow for a determination of an increase in data packet transmission times without using synchronized clocks in the source transmitter and the destination receiver simplifying the determination process.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for determining data packet transmission times in an Ethernet protocol including:
receiving a first data packet having a first data packet send time and a type of data payload each located in an Ether-Type field of a media access control (MAC) header of the first data packet, wherein the first data packet send time is a time the data packet is sent by a source transmitter;

subtracting the first data packet send time from a first data packet receive time to yield a first data packet transmission time, wherein the first data packet receive time is the time the data packet is received by a destination receiver;

comparing the first data packet transmission time to a third time;

determining whether a difference between the first data packet transmission time and the third time exceeds a threshold value; and sending a notification of a transmission delay responsive to determining that the difference between the first data packet transmission time and the third time exceeds the threshold value.

2. The method of claim 1, wherein the source transmitter includes a first clock.

3. The method of claim 1, wherein the destination receiver includes a second clock.

4. The method of claim 1, wherein the method further includes saving the first data packet transmission time, responsive to comparing the first data packet transmission time to a third time.

5. The method of claim 1, wherein the method further includes:

saving a plurality of data packet transmission times; and averaging the plurality of data packet transmission times to define an average data packet transmission time.

6. The method of claim 5, wherein the third time is the average data packet transmission time.

7. The method of claim 1, wherein the method further includes:

receiving a second data packet having a second data packet send time, wherein the second data packet send time is a time the data packet is sent by the source transmitter;

subtracting the second data packet send time from a second data packet receive time to yield a second data packet transmission time, wherein the second data packet receive time is the time the data packet is received by the destination receiver; and defining the third time as the second data packet transmission time.

8. The method of claim 1, wherein the method further includes saving the notification of a transmission delay responsive to determining that the difference between the first data packet transmission time and the third time exceeds the threshold value.

9. A system for receiving data comprising a destination receiver including a second clock, wherein the destination receiver is operative to receive a first data packet having a first data packet send time and a type of data payload each located in an EtherType field of a media access control (MAC) header of the first data packet, wherein the first data packet send time is a time the data packet is sent by a source transmitter, subtract the first data packet send time from a first data packet receive time to yield a first data packet transmission time, wherein the first data packet receive time is the time the data packet is received by the destination receiver, compare the first data packet transmission time to a third time, determine whether a difference between the first data packet transmission time and the third time exceeds a threshold value, send a notification of a transmission delay responsive to determining that the difference between the first data packet transmission time and the third time exceeds the threshold value.

10. The system of claim 9, wherein the system further comprises a memory operative to save the first data packet transmission time.

11. The system of claim 9, wherein the system further comprises a memory operative to save a plurality of data packet transmission times, and wherein the destination receiver is further operative to average the plurality of data packet transmission times to define an average data packet transmission time.

12. The system of claim 11, wherein the third time is the average data packet transmission time.

13. The system of claim 9, wherein the destination receiver is further operative to receive a second data packet having a second data packet send time, wherein the second data packet send time is a time the data packet is sent by the source transmitter, subtract the second data packet send time from a second data packet receive time to yield a second data packet transmission time, wherein the second data packet receive time is the time the data packet is received by the destination receiver, and define the third time as the second data packet transmission time.

14. A computer program product for providing real-time recommendations, the computer program product comprising:

a non-transitory computer-readable storage medium for storing instructions for executing a real-time recommendation service, the real-time recommendation service comprising a method of:

receiving a first data packet having a first data packet send time and a type of data payload each located in an EtherType field of a media access control (MAC) header of the first data packet, wherein the first data packet send time is a time the data packet is sent by a source transmitter;

subtracting the first data packet send time from a first data packet receive time to yield a first data packet transmission time, wherein the first data packet receive time is the time the data packet is received by a destination receiver;

comparing the first data packet transmission time to a third time;

determining whether a difference between the first data packet transmission time and the third time exceeds a threshold value; and sending a notification of a transmission delay responsive to determining that the difference between the first data packet transmission time and the third time exceeds the threshold value.

15. The computer program product of claim 14, wherein the real-time recommendation service further comprises the method of saving the first data packet transmission time, responsive to comparing the first data packet transmission time to a third time.

16. The computer program product of claim 14, wherein the real-time recommendation service further comprises the method of:

saving a plurality of data packet transmission times; and averaging the plurality of data packet transmission times to define an average data packet transmission time.

17. The computer program product of claim 16, wherein the third time is the average data packet transmission time.

18. The computer program product of claim 14, wherein the real-time recommendation service further comprises the method of:

receiving a second data packet having a second data packet send time, wherein the second data packet send time is a time the data packet is sent by the source transmitter;

subtracting the second data packet send time from a second data packet receive time to yield a second data packet transmission time, wherein the second data packet receive time is the time the data packet is received by the destination receiver; and defining the third time as the second data packet transmission time.

19. The computer program product of claim 14, wherein the real-time recommendation service further comprises the method of saving the notification of a transmission delay responsive to determining that the difference between the first data packet transmission time and the third time exceeds the threshold value.

* * * * *